Sept. 3, 1968      R. A. J. E. PIRLET      3,399,570
MEASURING TEMPERATURES

Filed Oct. 28, 1965      3 Sheets-Sheet 1

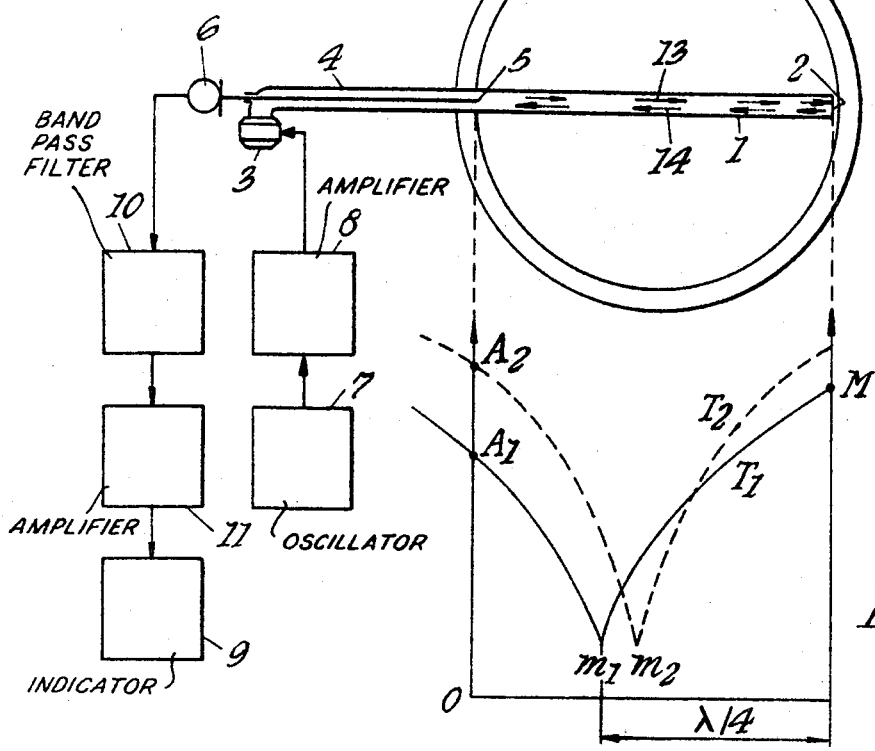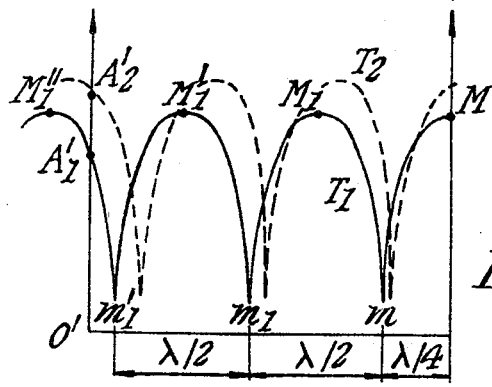

United States Patent Office 3,399,570
Patented Sept. 3, 1968

3,399,570
MEASURING TEMPERATURES
Robert Alfred J. E. Pirlet, Angleur, Belgium, assignor to Centre National de Recherches Metallurgiques, Brussels, Belgium, a corporation of Belgium
Filed Oct. 28, 1965, Ser. No. 505,496
Claims priority, application Luxembourg, Oct. 31, 1964, 47,264
2 Claims. (Cl. 73—339)

ABSTRACT OF THE DISCLOSURE

Apparatus for measuring temperature in a region comprises a sonic wave guide with one closed end adapted to be inserted into the region and means for propagating sonic waves towards the closed end for reflection to form a standing wave. A probe is inserted into the wave guide and the wave amplitude (acoustic pressure) at the probe end is adjusted to be at or near a minimum, indicating a node. The adjustment may be achieved by variation of the frequency of the propagated wave, in which case the frequency indicates the temperature. Alternatively, the probe may be located at a node for a known temperature and the acoustic pressure measured used as an indication of variation from the known temperature.

---

The present invention relates to apparatus for measuring temperature and more particularly though not exclusively to apparatus for measuring temperature finding application in metallurgy.

One particular object of the invention is to provide apparatus for measuring temperature which is quick to respond to changes in the temperature of the medium concerned.

Another object of the invention is to provide apparatus for measuring the temperature of diverse materials such as dust, dust-laden gases, scale, molten slag, foaming slag formed during the top-blowing of steel in a converter with oxygen, and molten metals.

Methods of and apparatus for measuring temperature are already known in which the time taken for a sound wave to pass along a guide exposed to the medium whose temperature is to be measured is determined, and the temperature derived from this determination. The disadvantage of such a method is that in practice it is found that a very long guide has to be used and that also the variation in the speed of sound in the guide follows an inverse square law as the temperature rises so that at the high temperatures necessary today in various metallurgical operations, the degree of sensitivity may well be insufficient.

Accordingly a further object of the present invention is to provide an acoustical apparatus for measuring temperature which is suitable for determining high temperatures and does not require the use of long guides.

I beileve that the nature of my invention will be best explained with reference to the attached diagrammatic drawings.

FIGURE 1 of these drawings shows a form of apparatus I have devised for measuring the temperature in a region using a guide with a closed end.

FIGURE 4 shows a further form of my apparatus.

FIGURES 5 and 6 show respectively two pressure distributions which can be obtained in the guide of the apparatus shown in FIGURE 4 using sound waves of different frequencies.

It will be gathered from the ensuing description that one principle of the methods about to be described with reference to the drawings may be stated as the principle of measuring temperatures using a guide having a closed end in a portion projecting into a region whose temperature is to be measured, the method comprising the steps of projecting sound along this portion of the guide so that it is reflected from the closed end to set up a standing wave, determining the acoustic pressure in the guide at a given point and deriving the temperature in the region as a function of this acoustic pressure.

Preferably the sound wave is reflected by a closed end of the guide.

Figures 1, 2, 3:
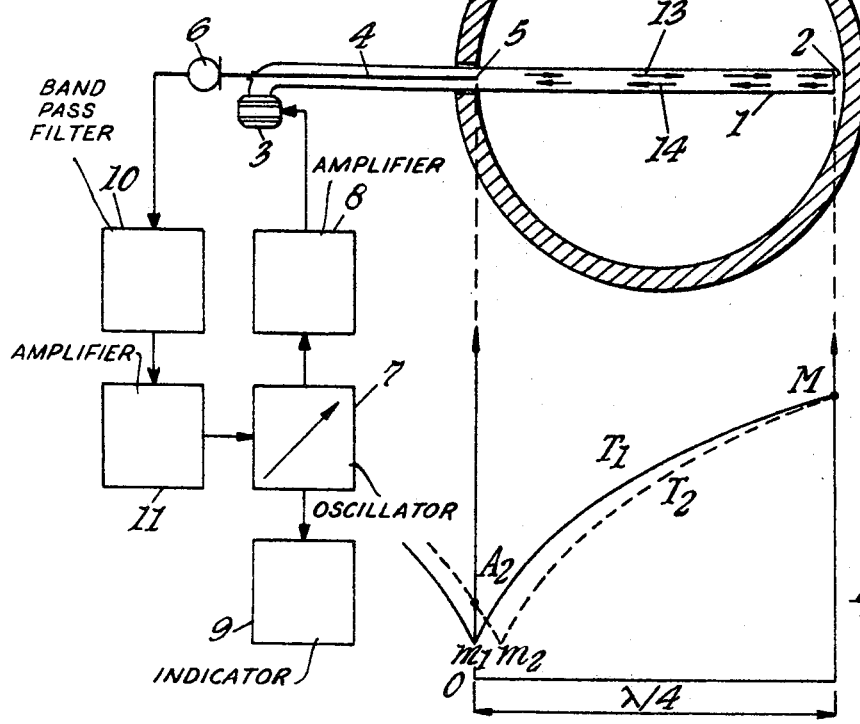
FIGURE 2 shows diagrammatically the variation in pressure along the guide.
FIGURE 3 shows an alternative pressure distribution along the guide achieved by directing sound waves of a higher frequency along the guide than was the case with the distribution shown in FIGURE 2.

Referring to the drawings and in particular to FIGURE 1, it can be seen that one form of my apparatus for measuring the temperature in an enclosed space 20 comprises a guide 1 in the form of a tube. Sound is projected into this guide by a loud speaker 3 fed through an amplifier 8 from an oscillator 7. The sound waves travel along the guide 1 and are reflected at its closed end 2 and pass back along the guide. A tubular probe 4 extends into the guide as far as a point 5 and is connected with a microphone or other acoustical-electrical transducer 6 connected with a band pass filter 10 which in turn is connected with an amplifier 11. The amplifier 11 is connected with an indicating device 9 and is preferably also connected with the oscillator 7.

The apparatus works as follows: by means of the loudspeaker 3, sound of a wavelength determined by the oscillator 7 is projected along the guide 1. The sound is reflected from the closed end 2 of the guide back along the guide to the left and this necessarily gives rise to a standing wave. It is found that the level of 'acoustic pressure" i.e. the sound level which is proportional to the amplitude of the standing wave at any point varies along the length of the guide. By "acoustic pressure" I mean a magnitude which can be determined by the use of the microphone 6 and the probe 4. The amplifier 11 produces a signal which is proportional to the signal produced by the microphone 6 and feeds it to the indicating device 9 which can, for instance, be a voltmeter or oscilloscope.

If there is an electrical or electronics connection between the amplifier 11 and the oscillator 7 the operation of the indicating device 9 is completely automatic. In other words, the frequency may be automatically varied until a minimum acoustic pressure is achieved at the end of the probe 5. The frequency at which this is achieved for a given position of the probe 5 is a measure of the temperature of the guide 1. Alternatively, if there is no such connection between the amplifier and the oscillator, the oscillator must be adjusted manually in accordance with the indication given by the amplifier to produce the minimum acoustic pressure indication. The indicator shows the frequency at which the oscillation is operating and can thus be treated as indicating the temperature.

It has been found advantageous to use a band pass filter 10 and an amplifier 11 such that the output voltage of the amplifier is directly proportional to the level of "acoustic pressure" at the point 5, at least within the range of frequencies which may be used.

The guide 1 can be made of a refractory material such as alumina or silicon carbide. If alumina should be used it should preferably be of at least 95% purity while in the case of silicon carbide the purity should be greater than 70%.

Alternatively a metallic guide can be used made for instance of AISI steels 304 or 310. The compositions of these steels are as follows.

AISI 304:

| | | |
|---|---|---|
| Carbon (maximum) | percent | 0.8 |
| Manganese (maximum) | do | 2 |
| Phosphorus (maximum) | do | 0.045 |
| Sulphur (maximum) | do | 0.030 |
| Silicon (maximum) | do | 1 |
| Chromium | do | 18–20 |
| Nickel | do | 18–20 |
| Scaling temperaure | ° C | 875 |

AISI 310:

| | | |
|---|---|---|
| Carbon (maximum) | percent | 0.25 |
| Manganese (maximum) | do | 2 |
| Phosphorus (maximum) | do | 0.045 |
| Sulphur (maximum) | do | 0.030 |
| Silicon (maximum) | do | 1.5 |
| Chromium | (Between) | 24 and 26 |
| Nickel | do | 19 and 22 |
| Scaling temperature | ° C | 1275 |

FIGURE 2 shows the variation in acoustic pressure along the length of the guide between the closed end 2 and the point 5 when the distance between the end and the point is one quarter of the wavelength of the sound at a temperature $T_1$. The horizontal axis of the graph of FIGURE 2 represents the distance from the point 5 while the vertical axis represents the "acoustic pressure," i.e. the pressure which can be determined with the microphone 3, or at any rate could be determined with the microphone 3 if the probe 4 could be moved to and fro along the guide between the point 5 indicated in the drawing and the closed end of the guide.

In FIGURE 2 the curve labelled $T_1$ in full lines represents the "acoustic pressure" at a temperature $T_1$ while the curve in broken lines represents the pressure at a temperature $T_2$, the frequency of the sound being the same. It can be seen that the acoustic pressure reaches a maximum at the closed end 2 of the guide, this maximum being denoted by M. At the point 5 the acoustic pressure at temperature $T_1$ reaches a minimum $m_1$. The minimum acoustic level corresponding to temperature $T_2$ occurs slightly to the right of the point 5 and is denoted by $m_2$. Both these minima $m_1$ and $m_2$ are given the same value in the graph but in reality they can be slightly different in value. FIGURE 3 indicates the variations in acoustic pressure obtained when the frequency is higher. It will be seen that the curve corresponding to temperature $T_1$ has three minima instead of one, that is to say $m$, $m_1$, and $m'_1$. Similarly the curve corresponding to temperature $T_2$ has also three minima, the left-hand minimum being denoted by $m'_2$.

A study of FIGURES 2 and 3 will show the following:

(1) It is better to adjust the wavelength so that a minimum rather than a maximum of acoustic pressure occurs near the point 5 since the curve is very much steeper near the maximum and consequently for a given change in temperature there will be a greater change in acoustic intensity near the minimum than near the maximum. Thus in the case of a temperature change from $T_1$ to $T_2$, the change in acoustic pressure as denoted in FIGURE 2 by the distance $m_1$–$A_2$.

(2) The improvement in sensitivity may be obtained by increasing the frequency of the sound produced by the loudspeaker 3 and projected into the guide 1. Thus it can be seen that with the greater frequency and therefore shorter wavelength of sound to which FIGURE 3 refers, the acoustic pressure or intensity curves are generally very much steeper than the curves obtained when the distance between the end of the guide 2 and the point 5 is as great as one quarter of the wavelength as indicated in FIGURE 2. Thus for a change in temperature from $T_1$ to $T_2$ there will be a change of acoustic pressure denoted by the distance $m'_1$–$A'_2$, considerably greater than the change of pressure denoted in FIGURE 2 for the same temperature change.

Instead of using the principle of keeping the frequency constant and measuring the strength of signal produced by the microphone 6, it is also possible to move the point 5 of measurement along the guide by moving the probe 4 inside the guide 1 in such a manner that the point 5 coincides with $a$ or the minimum of the acoustic pressure in the guide 1. The position of the point 5 will then be an indication of the temperature and the temperature can be derived from it by a suitable calibration.

It is also possible to determine temperatures in different parts of the region 20 by moving the guide and the probe together along the axis of the guide or otherwise.

FIGURES 4, 5 and 6 indicate the measurement of a temperature using an apparatus similar to the apparatus shown in FIGURE 1. In this case the probe 4 is kept stationary and the frequency of the sound projected into the guide 1 is kept constant. The same reference numerals are used as in FIGURES 1, 2 and 3. However in the case of FIGURE 5, the frequency of the sound is so chosen that one quarter of the wavelength is equal to about half the distance between the closed end of the guide and the point 5 instead of approximately equal to the whole of this distance. When the temperature changes from $T_1$ to $T_2$ the value of the acoustic pressure detected by the microphone 6 changes from $A_1$ to $A_2$.

When the frequency is increased so as to give the acoustic pressure distribution as indicated in FIGURE 6 there is again a variation in acoustic pressure at the point 5 indicated by the intercept $A'_1$–$A'_2$.

Preferably the sound wave used is a plane pure sound wave. In order to simplify the equipment used it may in certain circumstances be possible to feed the loudspeaker directly from AC mains instead of providing a special oscillator 7.

The indication of acoustic pressure given by the indicator 9 is directly related to the temperature.

It is also possible to use, instead of the amplifier 11, a bridge circuit coupled directly with an indicator.

Figure 7:
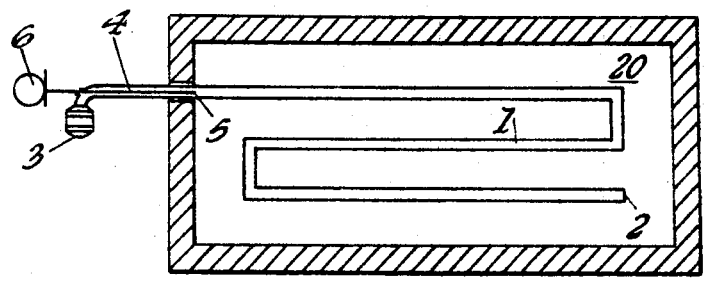
FIGURE 7 shows one specific form of guide that may be used in my invention.

FIGURE 7 indicates the guide 1 used for measuring temperature in a region 20 of rectangular shape. In order to obtain a more precise measurement of temperature the guide is convoluted having two 180° turns. The rest of the apparatus is as described with reference to FIGURE 1.

Figure 8:
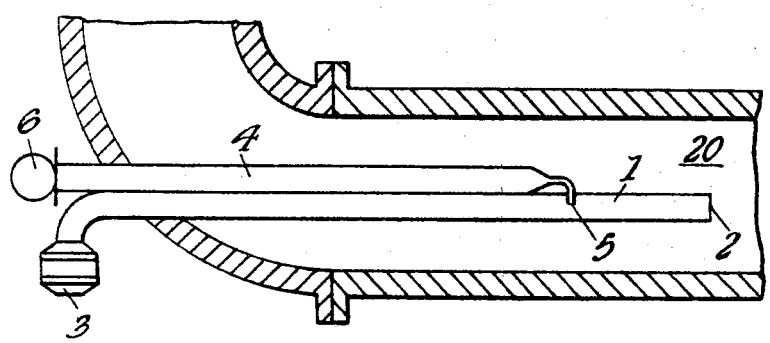
FIGURE 8 shows diagrammatically another form of guide.

FIGURE 8 shows an alternative arrangement for measuring temperature in a region 20 inside a duct through which a fluid passes. In this particular form of the apparatus in accordance with the invention the probe 4 lies outside the guide 1 for most of its length but its end which is tapered passes into the guide at the point 5.

Figure 9:
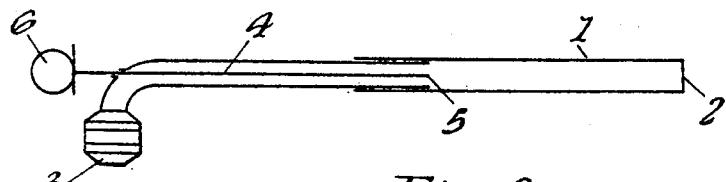
FIGURE 9 shows in a somewhat more diagrammatic manner yet another form of guide that may be used in putting my invention into effect.

FIGURE 9 indicates more diagrammatically an arrangement in which the effective length of the guide, and hence the distance between the closed end 2 and the point 5 can be varied.

While I have described several forms of my invention for enabling those skilled in the art to take full advantage of it, it is to be understood that the scope of the monopoly which I seek in the United States is to be by no means limited to such concrete forms but is to be defined by the spirit and gist of the following claims.

I claim:

1. Apparatus for measuring temperature in a region by utilizing the relationship between temperature and the velocity of sound in a given medium, the said apparatus comprising an elongated hollow guide having a closed end and adapted to project into the region of which the temperature is to be measured, with its closed end within the region, a loudspeaker for projecting sound waves along the guide for reflection by the closed end whereby a standing wave is established, a probe having one end projecting into the guide and the other end outside the guide, the said probe being mounted for movement along, into and out of the guide, an acoustic electrical transducer connected to the said other end of the probe for emitting an electrical signal related to the acoustic signal at the said one end of the probe, means for measuring the level of the said electrical signal, means for varying the frequency of the sound waves projected to obtain a minimum level of the said acoustic signal, as represented by the said electrical signal, and means for indicating the temperature in the region as a function of the frequency at the minimum acoustic signal level.

2. Apparatus for measuring temperature in a region by utilizing the relationship between temperature and the velocity of sound in a given medium, the said apparatus comprising an elongated hollow guide having a closed end and adjusted to project into the region of which the temperature is to be measured, with its closed end within the region, a loudspeaker for projecting sound waves along the guide for reflection by the closed end whereby a standing wave is established, a probe having one end projecting into the guide and the other end outside the guide, the said probe being mounted for movement along, into and out of the guide, an acoustic electrical transducer connected to the said other end of the probe for emitting an electrical signal related to the acoustic signal at the said one end of the probe, means for measuring the level of the said electrical signal at varying positions of the probe and means for indicating the temperature of the region from the level of acoustic signal represented by the said electrical signal, in relation to a minimum level obtained by movement of the probe.

References Cited

UNITED STATES PATENTS

| | | |
|---|---|---|
| 2,536,025 | 1/1951 | Blackburn _____ 73—362 XR |
| 2,758,663 | 8/1956 | Snavely. |
| 3,137,169 | 6/1964 | Clement et al. |
| 3,214,976 | 11/1965 | Miller. |
| 3,214,977 | 11/1965 | Apfel. |
| 3,299,707 | 1/1967 | Noel. |

DAVID SCHONBERG, *Primary Examiner.*

FREDERICK SHOON, *Assistant Examiner.*